United States Patent
Parrish et al.

(10) Patent No.: US 9,316,315 B2
(45) Date of Patent: Apr. 19, 2016

(54) SEAL ASSEMBLY

(75) Inventors: Russell P. Parrish, Glastonbury, CT (US); Jeffrey R. Lavin, Bloomfield, CT (US)

(73) Assignee: United Technologies Corporation, Hartford, CT (US)

( * ) Notice: Subject to any disclaimer, the term of this patent is extended or adjusted under 35 U.S.C. 154(b) by 861 days.

(21) Appl. No.: 13/416,174

(22) Filed: Mar. 9, 2012

(65) Prior Publication Data

US 2013/0234407 A1  Sep. 12, 2013

(51) Int. Cl.
| | | |
|---|---|---|
| F16J 15/34 | (2006.01) | |
| F16J 15/08 | (2006.01) | |
| F02K 1/00 | (2006.01) | |
| F02K 1/80 | (2006.01) | |
| B64D 29/00 | (2006.01) | |
| F02K 1/82 | (2006.01) | |

(52) U.S. Cl.
CPC ............ F16J 15/0887 (2013.01); B64D 29/00 (2013.01); F02K 1/004 (2013.01); F02K 1/805 (2013.01); F02K 1/82 (2013.01); *F05D 2240/55* (2013.01); *F05D 2250/75* (2013.01)

(58) Field of Classification Search
CPC ....... F16J 15/36; F16J 15/3436; F16J 15/344; F16J 15/3452
See application file for complete search history.

(56) References Cited

U.S. PATENT DOCUMENTS

| | | | |
|---|---|---|---|
| 2,886,262 A | 5/1959 | Fletcher | |
| 3,032,982 A | 5/1962 | Gaubatz | |
| 3,090,198 A | 5/1963 | Zeisloft | |
| 3,106,061 A | 10/1963 | Eder | |
| 3,270,505 A | 9/1966 | Crabill et al. | |
| 4,081,137 A | 3/1978 | Sutton et al. | |
| 4,251,986 A | 2/1981 | Thompson et al. | |
| 4,456,203 A | 6/1984 | Louthan | |
| 4,893,847 A * | 1/1990 | Hess | 285/226 |
| 5,351,888 A | 10/1994 | Taylor et al. | |
| 5,400,586 A | 3/1995 | Bagepalli | |
| 5,584,173 A | 12/1996 | Lybarger | |
| 5,593,112 A | 1/1997 | Maier et al. | |
| 5,897,120 A | 4/1999 | Scavo et al. | |
| 5,967,565 A * | 10/1999 | Kim | 285/49 |
| 7,163,206 B2 | 1/2007 | Cross et al. | |
| 2004/0017045 A1 | 1/2004 | Cross et al. | |

(Continued)

FOREIGN PATENT DOCUMENTS

| | | |
|---|---|---|
| GB | 2036888 A | 7/1980 |
| WO | 0227148 A1 | 4/2002 |

OTHER PUBLICATIONS

International Search Report and Written Opinion for International Application No. PCT/US2013/029473 completed on Dec. 6, 2013.
International Preliminary Report on Patentability for International Application No. PCT/US2013/029473 mailed on Sep. 18, 2014.
European Search Report for European Application No. 13797662.7 mailed Mar. 5, 2015.
Singapore Search Report for Singapore Patent Application No. 11201405428R mailed Jul. 31, 2015.

*Primary Examiner* — Gilbert Lee
(74) *Attorney, Agent, or Firm* — Carlson, Gaskey & Olds, PC

(57) ABSTRACT

A seal assembly seals an interface between adjacent liner sections. The seal assembly comprises a seal carrier mounted to a first plate, a seal body overlapping at least a portion of the seal carrier to define a plane of travel between the seal body and the seal carrier, and at least one resilient member configured to bias the seal body against a second plate. The seal carrier includes an indented portion that extends radially inward of the plane of travel.

21 Claims, 3 Drawing Sheets

(56) References Cited

U.S. PATENT DOCUMENTS

| | | |
|---|---|---|
| 2006/0179816 A1 | 8/2006 | Murphy et al. |
| 2007/0151229 A1 | 7/2007 | Farah et al. |
| 2007/0158527 A1 | 7/2007 | Farah et al. |
| 2008/0016871 A1 | 1/2008 | Lavin et al. |
| 2011/0232262 A1 | 9/2011 | Barry, Jr. et al. |

* cited by examiner

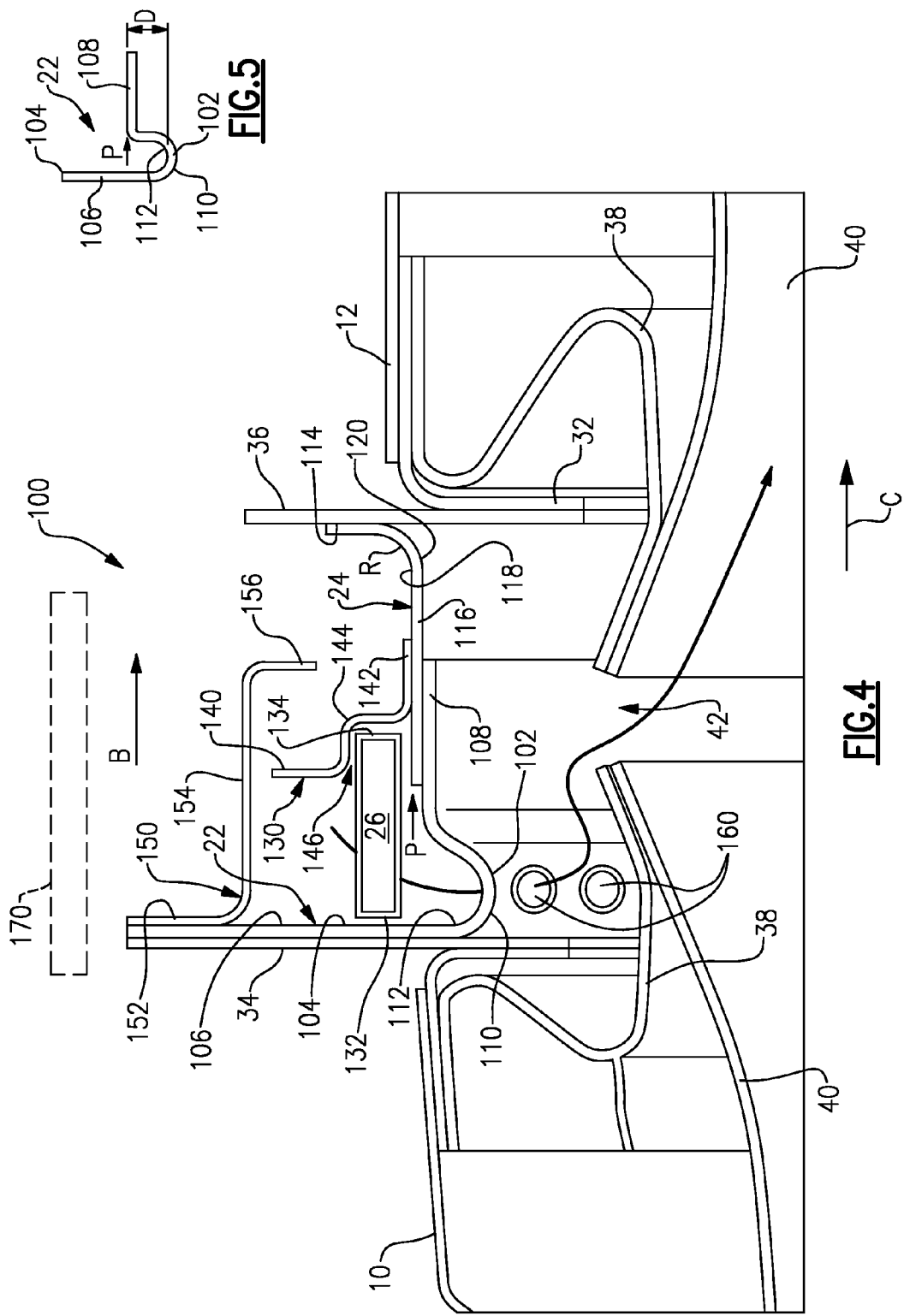

SEAL ASSEMBLY

STATEMENT OF GOVERNMENT INTEREST

This invention was made with government support under Contract No. N00019-02-C-3003 awarded by the United States Navy. The Government has certain rights in this invention.

BACKGROUND

Some aircraft have the capability to allow for vertical take offs and landings. The aircraft may have a vertical lift fan near a cockpit that balances vertical lift at a rear of the aircraft provided by swiveling an engine exhaust nozzle downwardly. Such a configuration utilizes a swivel joint to connect two or more liner sections that define a fluid flow path. The swivel joint includes seal assemblies at the connection interfaces between adjacent liner sections.

SUMMARY

In one exemplary embodiment, a seal assembly that seals an interface between adjacent liner sections comprises a seal carrier mounted to a first plate, a seal body overlapping at least a portion of the seal carrier to define a plane of travel between the seal body and the seal carrier, and at least one resilient member configured to bias the seal body against a second plate. The seal carrier includes an indented portion that extends radially inward of the plane of travel.

In a further embodiment of the above, the seal carrier comprises a carrier body having a first linear portion fixed to the first plate and a second linear portion in sliding engagement with the seal body along the plane of travel. The indented portion provides a transition between the first and second linear portions.

In a further embodiment of any of the above, the seal body comprises an annular component having a center axis, and the carrier body includes an inner surface facing the center axis and an outer surface facing away from the center axis. The outer surface of the indented portion is spaced radially inwardly toward the center axis and away from the plane of travel by a distance.

In a further embodiment of any of the above, the indented portion comprises a U-shape wherein a bottom of the U-shape is radially closer to the center axis than an inner surface of the second linear portion.

In a further embodiment of any of the above, the first and second linear portions are orientated transversely relative to each other.

In a further embodiment of any of the above, the seal body comprises a J-shape.

In a further embodiment of any of the above, the J-shape comprises a first leg biased against the second plate, a second leg sliding along the plane of travel, and a curved portion transitioning between the first and second legs, and wherein the first leg is shorter than the second leg.

In a further embodiment of any of the above, the assembly includes a clip fixed to the seal body, the resilient member having a first end reacting against the carrier body at the first plate and a second end reacting against the clip.

In a further embodiment of any of the above, the assembly includes a retainer having a base portion fixed to the first plate and an arm portion extending outwardly from the first plate to overlap at least a portion of the clip.

In a further embodiment of any of the above, the seal carrier includes a plurality of holes configured to meter flow into an exhaust gas flow path.

In a further embodiment of any of the above, the plurality of holes is formed within the indented portion.

In a further embodiment of any of the above, the first plate is configured for attachment to a first engine exhaust liner and the second plate is configured for attachment to a second engine exhaust liner that cooperate to define an exhaust gas flow path In a further embodiment of any of the above, the exhaust gas flow path comprises a core flow that flows internally through the first and second engine exhaust liners and including a bypass air flow path provided external to the first and second engine exhaust liners, the bypass air flow path defined within a fan nacelle.

In another exemplary embodiment, a sealed joint assembly comprises a first exhaust liner, a first plate fixed to the first exhaust liner, a second exhaust liner cooperating with the first exhaust liner to define an exhaust gas passageway having a center axis, a second plate fixed to the second exhaust liner, and a seal assembly positioned between the first and second exhaust liners. The seal assembly comprises a seal carrier mounted to the first plate, a seal body overlapping at least a portion of the seal carrier to define a plane of travel between the seal body and the seal carrier, and at least one resilient member configured to bias the seal body against the second plate. The seal carrier includes an indented portion that extends radially inward of the plane of travel.

In a further embodiment of any of the above, the seal carrier comprises a carrier body having a first linear portion fixed to the first plate and a second linear portion in sliding engagement with the seal body along the plane of travel, and wherein the indented portion provides a transition between the first and second linear portions.

In a further embodiment of any of the above, the first and second linear portions are orientated transversely relative to each other and the indented portion comprises a U-shape with a bottom of the U-shape being radially closer to the center axis than a bottom surface of the second linear portion.

In a further embodiment of any of the above, the seal body comprises a J-shape.

In a further embodiment of any of the above, the J-shape comprises a first leg biased against the second plate, a second leg sliding along the plane of travel, and a radius portion that transitions between the first and second legs, and wherein the first leg is shorter than the second leg.

In a further embodiment of any of the above, the assembly includes a clip fixed to the seal body, the resilient member having a first end reacting against the carrier body at the first plate and a second end reacting against the clip.

In a further embodiment of any of the above, the seal carrier includes a plurality of holes configured to meter flow into an exhaust gas flow path. The plurality of holes is formed within the indented portion.

BRIEF DESCRIPTION OF THE DRAWINGS

The disclosure can be further understood by reference to the following detailed description when considered in connection with the accompanying drawings wherein:

FIG. 4 is a cross-sectional view of a seal assembly incorporating the subject invention.

FIG. 5 is a schematic illustration of a seal carrier from the seal assembly of FIG. 4.

DETAILED DESCRIPTION

Figure 1:
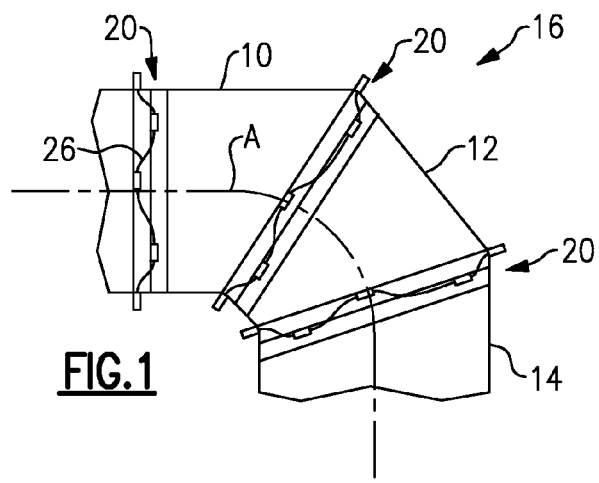
FIG. 1 is a schematic illustration of adjacent exhaust liner sections incorporating a seal assembly.
Figure 6:
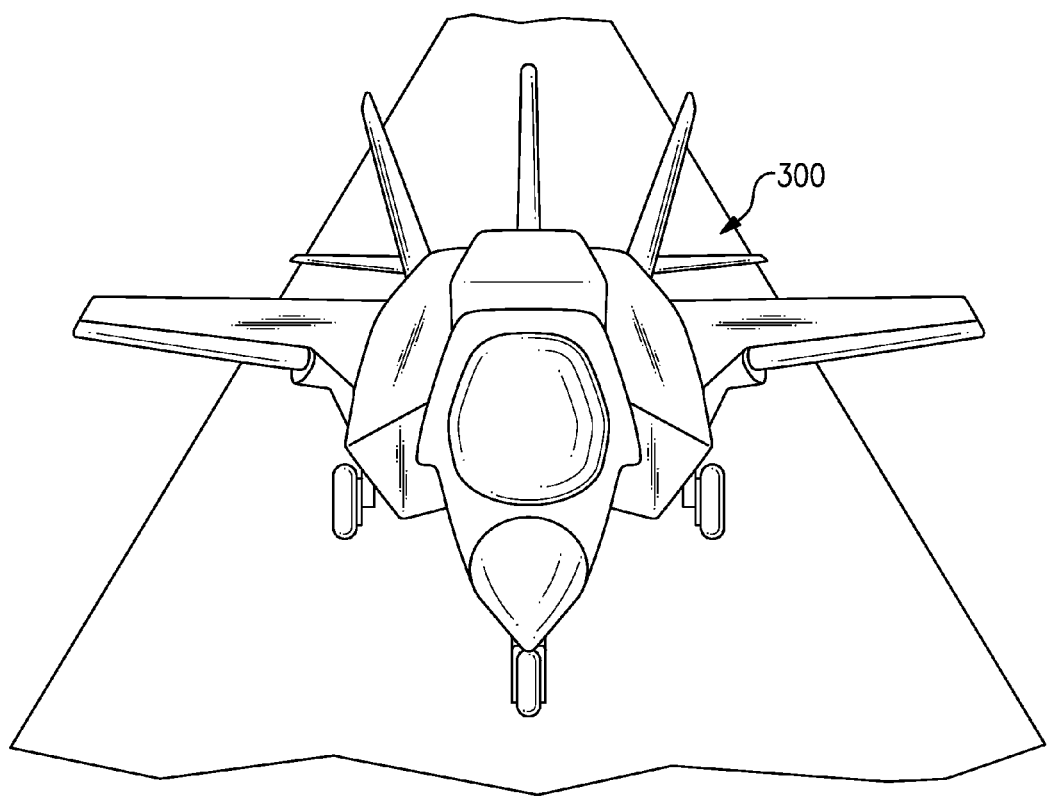
FIG. 6 is a schematic illustration of a vertical take off and landing aircraft that includes the seal assembly of FIG. 4.

FIG. 1 illustrates a plurality of exhaust liner sections 10, 12, 14 for a swivel joint 16. In one example, the swivel joint 16 is used in an aircraft 300 (FIG. 6) that has the capability to allow for vertical take offs and landings. FIG. 6 shows one such aircraft 300 as an example. Such a configuration utilizes the swivel joint 16 to connect two or more adjacent liner sections 10, 12, 14 that define a fluid flow path.

Figure 2:
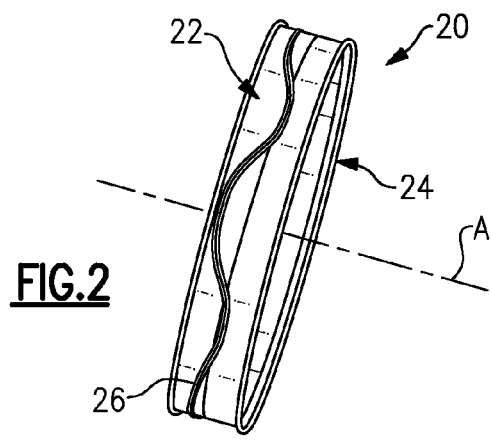
FIG. 2 is a schematic illustration of a perspective view of a seal assembly comprising a seal carrier, seal body, and resilient member.

In the example shown, liner section 10 comprises a forward exhaust liner section, liner section 12 comprises an intermediate exhaust liner section, and element 14 comprises a rearward exhaust liner section. Between each pair of adjacent exhaust liner sections 10, 12, 14 is a seal assembly 20. The seal assembly 20 comprises a seal carrier 22, a seal body 24, and a resilient member 26 as shown in FIG. 2. The seal body 24 slides relative to the seal carrier 22 to expand and contract as the resilient member is compressed or expanded. The seal carrier 22 and seal body 24 comprise annular members that define a center axis A. In the example shown, the resilient member 26 comprises a wave spring; however, other types of springs could also be used. Further, while a single resilient member 26 is shown, a plurality of resilient members could also be installed between the seal carrier 22 and seal body 24.

Figure 3:
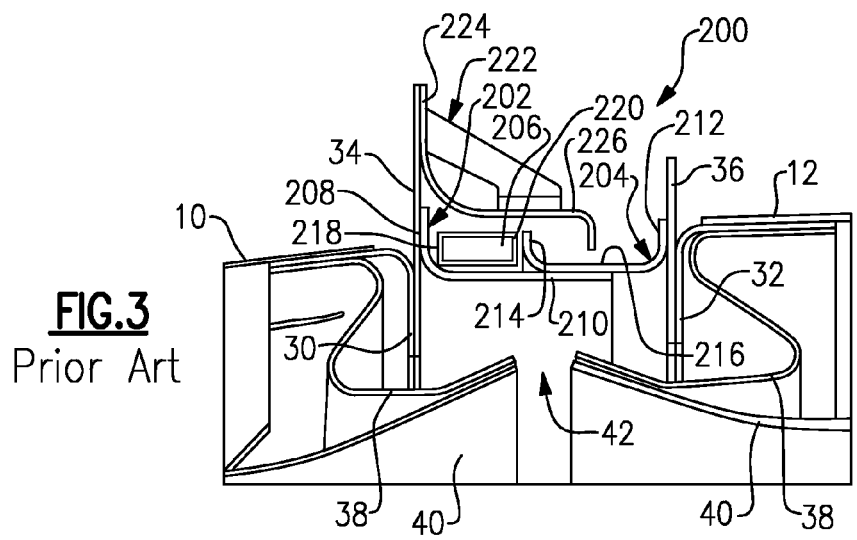
FIG. 3 is a cross-sectional view of a prior art seal assembly.

FIG. 3 illustrates a prior art seal assembly 200. In this example, the seal assembly 200 is positioned between the forward exhaust liner section 10 and the intermediate exhaust liner section 12; however, the seal assembly 200 would be similarly configured between other adjacent liner sections. The forward exhaust liner section 10 includes a first inwardly extending flange 30 and the intermediate exhaust liner section 12 includes a second inwardly flange 32 that is spaced apart from and faces the first inwardly extending flange 30. A first plate 34 is fixed to the first inwardly extending flange 30 and a second plate 36 is fixed to the second inwardly extending flange 32. Liner closeouts 38 and liner sheets 40 are associated with the forward 10 and intermediate 12 exhaust liner sections. Distal ends of the liner closeouts 38 and liner sheets 40 are separated by a gap 42. This example liner configuration is generally the same as that shown in FIG. 4, which illustrates the subject seal assembly 100.

The prior art seal assembly of FIG. 3 includes a seal carrier 202, a seal body 204, and a resilient member 206. The seal carrier 202 is L-shaped in cross-section and the seal body 204 is U-shaped in cross-section. The seal carrier 202 includes a first leg 208 that is fixed to the first plate 34 and a second leg 210 that extends toward the seal body 204. The first leg 208 is shorter than the second leg 210. The seal body 204 includes a first leg 212 and a second leg 214 that are connected to each other by a base portion 216 to form the U-shape. The base portion 216 slides on top of the second leg 210 of the seal carrier 202 to define a plane of travel.

The first leg 212 abuts against the second plate 36. The resilient member 206 has a first end 218 that reacts against the first leg 208 of the seal carrier 202 at the first plate 34 and a second end 220 that reacts against the second leg 214 of the seal body 204. The resilient member 206 pre-loads the seal body 204 against the second plate 36. A retainer 222 has a first portion 224 fixed to the first plate 34 and an arm portion 226 that extends over the resilient member 206 and overlaps the second leg 214 and at least a portion of the base portion 216 of the seal body 204. The retainer 222 prevents the resilient member 206 and seal body 204 from dis-assembling from the second plate 36.

This configuration has several disadvantages. First, there is a lack of sufficient axial travel length between the seal body and the seal carrier as the resilient member moves between retracted and expanded positions. Second, there is a tendency for the resilient member to rotate causing the resilient member to slide underneath the seal body along the plane of travel.

The seal assembly 100 of FIG. 4 provides a configuration with increased travel and positive spring retention all within the same amount of packaging space as that of FIG. 3. As discussed above, the seal assembly 100 includes a seal carrier 22, a seal body 24, and a resilient member 26. The seal body 24 slides relative to the seal carrier 22 to expand and contract the joint 16 as the resilient member 26 is compressed or expanded. The seal carrier 22 and seal body 24 comprise annular members that define a center axis A.

The seal carrier 22 is mounted to the first plate 34 and the seal body 24 overlaps at least a portion of the seal carrier 22 to define a plane of travel P between the seal body 24 and the seal carrier 22. The plane of travel P comprises an area of sliding contact along an axial direction between the seal body 24 and seal carrier 22. The resilient member 26 is configured to bias the seal body 24 against the second plate 36. The seal carrier 22 includes an indented portion 102 that extends radially inward of the plane of travel P.

The seal carrier 22 comprises a carrier body 104 having a first linear portion 106 fixed to the first plate 34 and a second linear portion 108 in sliding engagement with the seal body 24 along the plane of travel P. The indented portion 102 provides a transition between the first 106 and second 108 linear portions.

The carrier body 104 includes an inner surface 110 facing the center axis A and an outer surface 112 facing away from the center axis A. The distance between the inner surface 110 and the outer surface 112 defines the thickness of the carrier body 104. The outer surface 112 at the indented portion 102 is spaced radially inwardly toward the center axis A and away from the plane of travel P by a distance D. The indented portion 102 comprises a U-shape where a bottom of the U-shape is radially closer to the center axis A than the first 106 and second 108 linear portions.

The first 106 and second 108 linear portions are orientated transversely relative to each other. In one example, the first 106 linear portion is generally perpendicular to the second linear portion 108.

The seal body 24 comprises a J-shape. The J-shape comprises a first leg 114 biased against the second plate 36, a second leg 116 sliding along the plane of travel P, and a radiused portion R transitioning between the legs 114, 116. The first leg 114 is shorter than the second leg 116. The seal body 24 has an outer surface 118 and an inner surface 120 that are separated by a seal thickness. The inner surface 120 of the second leg 116 rests directly on top of the outer surface 112 of the carrier body 104. The second leg 116 of the seal body 24 slides along the fixed second linear portion 108 of the carrier body 104 as the resilient member 26 moves between contracted and expanded positions.

A clip 130 is fixed to the seal body 24 such that the clip 130 and seal body 24 move together as a unitary piece. In one example, the clip 130 is brazed or welded to the seal body 24; however, other attachment methods could also be used. The resilient member 126 has a first end 132 reacting against the first linear portion 106 of the carrier body 104 at the first plate 34 and a second end 134 reacting against the clip 130.

The clip 130 includes a first linear portion 140 that is spaced apart from and generally parallel to the first plate 34 and a second linear portion 142 that is fixed to the outer surface 118 of the seal body 24. An S-shaped connecting portion 144 connects the first linear portion 140 to the second linear portion 142. The S-shaped connecting portion 144 forms a concave pocket area 146 that receives the second end 134 of the resilient member 26. Thus, the S-shaped connecting portion 144 prevents the resilient member 26 from moving away from the seal carrier 22 in a radial direction.

A retainer 150 has a base portion 152 fixed to the first plate 34 and an arm portion 154 that extends outwardly from the base portion 152, over the resilient member 26, and further extends to overlap at least a portion of the clip 130. The arm portion 154 extends generally parallel to the second linear portion 108 of the carrier body 104. A distal end portion 156 of the arm portion 154 extends radially inwardly toward the axis A. The distal end portion 156 is spaced apart from and axially faces the first linear portion 140 of the clip 130.

The seal carrier 22 includes a plurality of holes 160 configured to meter flow into an exhaust gas flow path through the gap 42. In one example, the plurality of holes 160 is formed within the indented portion 102. The holes 160 are circumferentially spaced apart from each other about the axis A. Flow from a bypass flow B is directed through the holes 160 and into a core flow C. The forward exhaust liner section 10 and the intermediate exhaust liner section 12 define the exhaust gas flow path which comprises the core flow C. In one example, the liner sections form part of the augmentor section of an engine. The bypass flow B flows externally to these liner sections.

In another example, the bypass flow path B is provided external to connecting sections 10, 12 of a gas turbine engine and is defined within a fan nacelle, schematically indicated at 170, of a commercial engine. The bypass flow B is between an inner surface of the fan nacelle 170 and an outer surface of the connecting sections 10, 12. In one example, the seal assembly is used in a variable area nozzle of the engine.

The configuration of FIG. 4 offers several advantages over the configuration shown in FIG. 3. The resilient member 26 is effectively captured by the seal body 24 and clip 130. By locating the second end 134 of the resilient member 26 in the pocket 146, i.e. in an area between a bottom surface of the clip 130 and the outer surface 118 of the seal body 24, the resilient member 26 cannot slide underneath the seal body 24.

The J-section of the seal body 24 allows increased travel in combination with positive retention. There is no longer wasted space in the radius. Further, there is increased travel in both the expansion and contraction directions. Moving the radius of the seal carrier 22 radially inwardly by the distance D, i.e. providing the indented portion 102, increases compression travel distance, while eliminating the back radius portion leg 214 (FIG. 3) of the prior seal configuration increases expansion travel distance as there is less of a tendency for the spring to ride underneath this portion of the seal.

Additionally, the indented portion 102 of the seal carrier 22, i.e. the dropped radius portion on the seal carrier 22, allows full motion to backing plane with no interference in the bend radius. Further, the metered flow control holes 160 in the indented portion 102 can be used to purge internal cavities.

Although an example embodiment has been disclosed, a worker of ordinary skill in this art would recognize that certain modifications would come within the scope of the claims. For that reason, the following claims should be studied to determine their true scope and content.

What is claimed is:

1. A seal assembly that seals an interface between adjacent liner sections comprising:
   a seal carrier mounted to a first plate;
   a seal body overlapping at least a portion of the seal carrier to define a plane of travel between the seal body and the seal carrier;
   at least one resilient member configured to bias the seal body against a second plate;
   wherein the seal carrier includes an indented portion that extends radially inward of the plane of travel; and
   a clip fixed to the seal body, wherein the clip includes a first end that is directly fixed to the seal body and a second end that extends in a radially outward direction.

2. The seal assembly according to claim 1 wherein the seal carrier comprises a carrier body having a first linear portion fixed to the first plate and a second linear portion in sliding engagement with the seal body along the plane of travel, and wherein the indented portion provides a transition between the first and second linear portions.

3. The seal assembly according to claim 2 wherein seal body comprises an annular component having a center axis, and wherein the carrier body includes an inner surface facing the center axis and an outer surface facing away from the center axis, and wherein the outer surface of the indented portion is spaced radially inwardly toward the center axis and away from the plane of travel by a distance.

4. The seal assembly according to claim 2 wherein the first and second linear portions are orientated transversely relative to each other.

5. The seal assembly according to claim 1 wherein the seal body comprises a J-shape.

6. The seal assembly according to claim 5 wherein the J-shape comprises a first leg biased against the second plate, a second leg sliding along the plane of travel, and a curved portion transitioning between the first and second legs, and wherein the first leg is shorter than the second leg.

7. The seal assembly according to claim 1 wherein the resilient member has a first end reacting against the carrier body at the first plate and a second end reacting against the clip.

8. The seal assembly according to claim 7 including a retainer having a base portion fixed to the first plate and an arm portion extending outwardly from the first plate to overlap at least a portion of the clip.

9. The seal assembly according to claim 1 wherein the first plate is configured for attachment to a first engine exhaust liner and the second plate is configured for attachment to a second engine exhaust liner that cooperate to define an exhaust gas flow path.

10. The seal assembly according to claim 9 wherein the exhaust gas flow path comprises a core flow that flows internally through the first and second engine exhaust liners and including a bypass air flow path provided external to the first and second engine exhaust liners, the bypass air flow path defined within a fan nacelle.

11. The seal assembly according to claim 1 wherein the seal carrier defines a center axis and includes a linear portion at the plane of travel, and wherein the indented portion comprises a surface that curves radially inward from the linear portion toward the center axis to form an enlarged gap between the at least one resilient member and the seal carrier.

12. The seal assembly according to claim 1 wherein the seal carrier defines a center axis, and wherein the indented portion is in an overlapping relationship with the at least one resilient member in a radial direction.

13. A seal assembly that seals an interface between adjacent liner sections comprising:
   a seal carrier mounted to a first plate;
   a seal body overlapping at least a portion of the seal carrier to define a plane of travel between the seal body and the seal carrier;
   at least one resilient member configured to bias the seal body against a second plate; and
   wherein the seal carrier includes an indented portion that extends radially inward of the plane of travel, and wherein the seal carrier comprises a carrier body having a first linear portion fixed to the first plate and a second linear portion in sliding engagement with the seal body along the plane of travel, and wherein the indented portion provides a transition between the first and second linear portions, and wherein seal body comprises an annular component having center axis, and wherein the carrier body includes an inner surface facing the center axis and an outer surface facing away form the center axis, and wherein the outer surface of the indented portion is spaced radially inwardly toward the center axis and away from the plane of travel by a distance, and wherein the indented portion comprises a U-shape wherein a bottom of the U-shape is radially closer to the center axis than an inner surface of the second linear portion.

14. A seal assembly that seals an interface between adjacent liner sections comprising:
   a seal carrier mounted to a first plate;
   a seal body overlapping at least a portion of the seal carrier to define a plane of travel between the seal body and the seal carrier;
   at least one resilient member configured to bias the seal body against a second plate; and
   wherein the seal carrier includes an indented portion that extends radially inward of the plane of travel, and wherein the seal carrier includes a plurality of holes configured to meter flow into an exhaust gas flow path.

15. The seal assembly according to claim 14 wherein the plurality of holes are formed within the indented portion.

16. A seal assembly that seals an interface between adjacent liner sections comprising:
   a seal carrier mounted to a first plate;
   a seal body overlapping at least a portion of the seal carrier to define a plane of travel between the seal body and the seal carrier;
   at least one resilient member configured to bias the seal body against a second plate; and
   wherein the seal carrier includes an indented portion that extends radially inward of the plane of travel, and wherein the seal carrier defines a center axis and includes a linear portion at the plane of travel, and wherein the indented portion comprises a surface that curves radially inward from the linear portion toward the center axis to form an enlarged gap between the as least one resilient member and the seal carrier, and wherein the linear portion of the seal carrier comprises a first linear portion that is in sliding engagement with the seal body along the plane of travel, and wherein the seal carrier includes a second linear portion fixed to the first plate, and wherein a radially outer surface of the first linear portion is spaced from the resilient member by a first distance and wherein the surface of the indented portion is spaced from the resilient member by a second distance that is greater than the first distance to form the enlarged gap.

17. A seal assembly that seals an interface between adjacent liner sections comprising:
   a seal carrier mounted to a first plate;
   a seal body overlapping at least a portion of the seal carrier to define a plane of travel between the seal body and the seal carrier;
   at least one resilient member configured to bias the seal body against a second plate; and
   wherein the seal carrier includes an indented portion that extends radially inward of the plane of travel wherein the seal carrier has a first surface in abutting engagement with the first plate and a second surface facing opposite the first surface, and including a retainer that abuts against the second surface.

18. The seal assembly according to claim 17 wherein the retainer comprises a first linear portion in abutting engagement with the second surface and an arm portion extending in an axial direction and spaced radially outward of the at least one resilient member and seal body.

19. The seal assembly according to claim 18 wherein the retainer includes a distal end spaced from the first liner portion that extends in a radially inward direction toward a center axis defined by the seal body.

20. The seal assembly according to claim 19 including a clip fixed to the seal body, the resilient member having a first end reacting against the carrier body at the first plate and a second end reacting against the clip, and wherein the arm portion of the retainer is spaced radially outward of the clip.

21. The seal assembly according to claim 20 wherein the clip includes a first end that is directly fixed to the seal body, a second end that is free from contact with the resilient member, and a middle transition portion connecting the first and second ends, and wherein the middle transition portion forms a curved pocket to receive one end of the resilient member.

* * * * *